United States Patent [19]
Hoshina et al.

[11] 3,886,424
[45] May 27, 1975

[54] CONTROL SYSTEM HAVING ACTUAL BACKLASH COMPENSATING APPARATUS

[75] Inventors: Naomi Hoshina, Yokohama; Etsuji Suzuki, Kawasaki, both of Japan

[73] Assignee: Tokyo Shibaura Electric Co., Ltd., Japan

[22] Filed: Mar. 14, 1972

[21] Appl. No.: 234,611

[30] Foreign Application Priority Data
Sept. 10, 1971 Japan.............................. 46/70228

[52] U.S. Cl................................ 318/630; 318/604
[51] Int. Cl. ............................................. G05b 11/01
[58] Field of Search............................ 318/630, 604

[56] References Cited
UNITED STATES PATENTS

| | | | |
|---|---|---|---|
| 2,913,648 | 11/1959 | Brouwer | 318/630 X |
| 2,928,033 | 3/1960 | Abbott | 318/604 |
| 3,104,349 | 9/1963 | Stevens | 318/630 X |
| 3,560,830 | 2/1971 | Steinberg | 318/630 |

*Primary Examiner*—T. E. Lynch
*Attorney, Agent, or Firm*—Oblon, Fisher, Spivak, McClelland & Maier

[57] ABSTRACT

An actual backlash compensating apparatus for a screw driven system includes a worktable, a drive screw, a nut and a drive unit for driving the worktable so as to linearly travel in accordance with the drive screw and nut. A rotation angle detector generates a signal corresponding to the angle through which the drive screw is made to rotate. A servo system determines the position of the worktable by comparing the output signal from the rotation angle detector with a predetermined input signal supplied by a numerical controller. A displacement detector is coupled to the worktable for detecting errors in the positioning thereof caused by backlash between the starting position of the worktable and the driver screw. The signal from the displacement detector is applied to a differential amplifier along with the signal determined by the servo system such that any backlash referred to above is eliminated. Additionally one or more axis displacement detectors are provided for eliminating any backlash due to the axis position of the drive screw.

7 Claims, 5 Drawing Figures

3,886,424

CONTROL SYSTEM HAVING ACTUAL BACKLASH COMPENSATING APPARATUS

BACKGROUND OF THE INVENTION

1. Field Of The Invention

This invention generally relates to a system for automatically controlling machine tools and more particularly to an improvement for compensating for backlash in the clearance space between a drive screw and a nut and in the axis position of the drive screw.

2. Description Of The Prior Art

Generally, in control apparatus having a drive screw such as a power screw or a lead screw for by way of example driving a cutter table or a lead plate of a manufacturing machine, a conventional screw or ball type screw are used for the driving. In such a control apparatus a backlash or clearance would exist in the drive screw of the control apparatus and accordingly a backlash worktable apparatus would have to be provided. The backlash compensating apparatus would assure that the numerical control equipment for the workable would operate accurately.

In the operation of such conventional backlash compensating apparatus, only one quantity was fed to the worktable by the drive screw which would rotate the same clockwise. This was necessary since, assuming that the drive screw stopped at a given position, and then the worktable was re-driven by the drive screw after having been stopped at that position, it would be assured that the rotatory direction of the drive screw corresponded with the rotatory direction before the worktable was stopped. Under such conditions there would be no backlash between the drive screw and the worktable. Otherwise, if it is assumed that the rotatory direction of the drive screw reversed from its initial direction before being stopped then a backlash would occur between the drive screw and the worktable. This backlash would cause an error which would be compensated for by rotating the drive screw with an additional quantity which would correspond to a predetermined and estimated, as opposed to actual, amount. Generally, while somewhat satisfactory, the above mentioned conventional backlash compensating apparatus has been found to have certain drawbacks. Thus, in the past the amount of backlash had to be arbitrarily selected by the condition of the drive screw and the nut and a complicated factor of the load condition which was added to the table. Moreover, the amount of estimated backlash was not always selected by using the same driving apparatus. Additionally with the conventional apparatus a reverse motion operation adds an excessive predetermined amount of driving whereby it then became impossible to completely eliminate the driving error backlash.

In fact, with the conventional prior art apparatus, the driving error developed in a reverse motion would be increased by the operation of the backlash compensating apparatus. Also, in the past when a work table was driven at a high speed and then quickly stopped, the worktable often would not stop at the same time as that of the drive screw. This extra motion of the worktable was thus due to its own inertia. If such extra motion was excessive, then the worktable would be stopped with the result that the backlash would be of an even larger value.

SUMMARY OF THE INVENTION

Accordingly, it is one object of this invention to provide a new and improved unique control system having a backlash compensating apparatus for eliminating any backlash error which is caused by the drive screw and nut thereof.

Another object of this invention is to provide a new and improved unique control system which includes means for detecting a quantity corresponding to an actual backlash and means for accurately compensating the driving in accordance therewith so as to omit any error resulting from the actual backlash.

A further object of this invention is to provide a new and improved unique control system which includes a detector for detecting any backlash due to the direction of the drive screw axis.

Briefly, in accordance with the present invention, the foregoing and other objects are in one aspect obtained by the provision of a backlash compensating apparatus for a screw driven system which includes a worktable, a drive screw and a nut. A drive unit is provided for driving the worktable so as to linearly travel in accordance with the drive screw and nut. A rotation angle detecting means is provided for generating a signal which corresponds to the angle through which the drive screw is made to rotate by the drive nut. A servo system is further provided for determining the position of the worktable by collating the output signal from the rotation angle detecting means with a predetermined input value. A displacement detector is coupled to the worktable for detecting any error in the positioning thereof due to backlash between a starting position of the worktable and a starting position of the drive screw. Still further means are provided for correcting the backlash in accordance with the output signals from the displacement detector.

BRIEF DESCRIPTION OF THE DRAWINGS

A more complete application of the invention and many of the attendant advantages thereof will be readily apparent as the same becomes better understood by reference to the accompanying drawing, wherein.

DETAILED DESCRIPTION OF THE PREFERRED EMBODIMENTS

Figure 1:
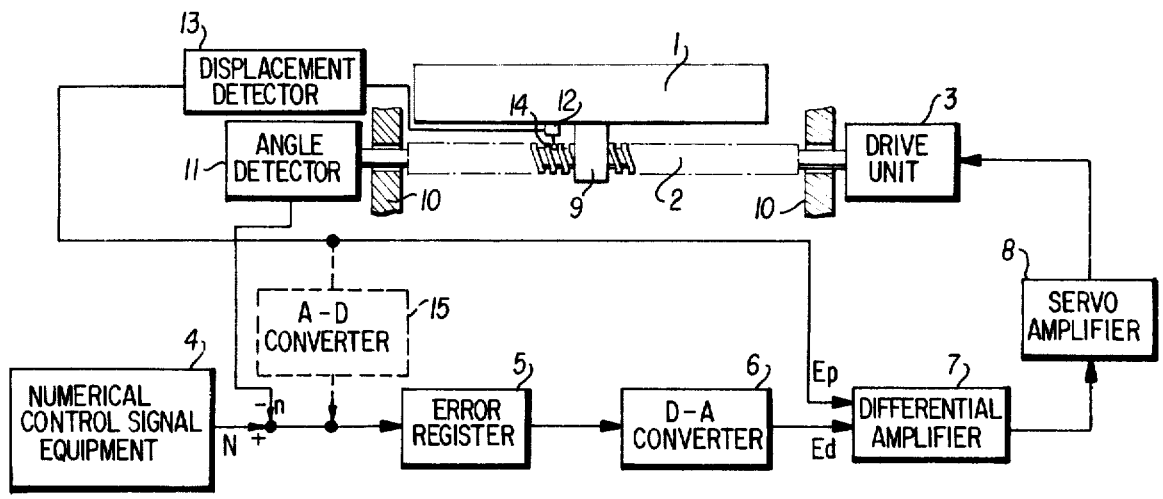
FIG. 1 is a schematic block diagram of a control system according to an embodiment of this invention.

Referring now to the drawings wherein like reference numerals designate identical or corresponding parts throughout the several views and more particularly to FIG. 1 thereof wherein is shown an embodiment of a servo-control system according to the present invention for determining the position of a worktable 1 by detecting the backlash of a drive screw 2 which is driven by a drive unit 3. A numerical control signal equipment 4 is provided for generating a plurality of digital signals N in accordance with previously recorded preset input values. The numerical control signal equipment 4 may be conventionally of the magnetic or perforated tape controlled type with the preset input values stored on the tape. The digital signals N from the numerical control signal equipment 4 are supplied through an error register 5 to a digital-to-analog converter 6 (hereinafter referred to as a "D-A converter") for converting the digital signals N into corresponding analog signals Ed.

The analog signals Ed obtained by the conversion are supplied through a differential amplifier 7 to a servo-amplifier 8. The output of the servo-amplifier 8 actuates the drive unit 3 which may, for example, be a conventional electric servo-motor or an oil pressure servo-motor. The drive unit 3 is connected to the drive screw 2 through an output shaft thereof and serves to rotate the drive screw 2 and thereby cause the worktable 1 to linearly travel in accordance with a nut 9. Both ends of the drive screw 2 are journaled in a bearing 10.

An angle detector 11 is provided and each time the drive screw 2 rotates a given amount, the angle detector 11 will detect the same and generate electric pulse signals $n$ indicative thereof. The angle detector 11 may be constituted of a disk plate having a plurality of perforated slits at equal spaces along the periphery thereof and designed so as to rotate with the drive screw 2, a light source and a photoelectric conversion element disposed on the opposite side of the perforated peripheral portion of the disk.

The output pulse signals $n$ generated from the angle detector 11 are compared with the predetermined value of the input signals N generated from the numerical control signal equipment 4 such that the worktable 1 will shift until the difference therebetween is reduced to zero. At this time the output generated from the error register 5 is reduced to zero.

With the present invention any difference between the actual travel of the worktable 1 and the drive screw 2 can be detected in the form of electric analog signals in accordance with a shifting contact member 12 of a conventional displacement detector 13. The shifting contact member 12 is affixed to the worktable 1 and has a contactor 14 depending therefrom which may be an electric micrometer which makes contact with the drive screw 2.

Now, if it is assumed that worktable 1 is maintained at a given position, then no output will be generated from the displacement detector 13. When, under such a stationary condition, if the drive screw 2 now rotates through a given angle so as to cause the worktable 1 to travel, then output signals $E_p$ may be generated from the displacement detector 13 and will indicate any error in the position of the worktable 1. It should be understood that any error in the position of the worktable 1 will be those resulting from the cumulative pitch and deformation of the thread of the drive screw 2, i.e., backlash. The output signals Ep which represents the error in the position of the worktable 1 due to backlash are supplied to the differential amplifier 7 so as to produce a difference between the output Ed generated from the D-A converter 6 and the aforesaid error output signals Ep. The operation of the drive unit 3 is thereby controlled so as to reduce the error difference to zero or a predetermined value. It should now be apparent that any errors arising from backlash in the positioning of the worktable caused by the drive screw 2 can be readily corrected.

The above mentioned description has assumed the case wherein the displacement detector 13 was in an initial state of zero such that no output would be generated therefrom. Generally, however, it should be clear that even when output signals are initially generated from the displacement detector 13 so as to indicate values other than zero that any error in the positioning of the worktable 1 resulting from the drive screw 2 can be corrected by controlling the output signals generated from the differential amplifier 7 so as to indicate zero or a predetermined value.

An alternative embodiment for FIG. 1 is shown by the A-D converter 15 which is indicated by the dotted lines of FIG. 1. In the alternative embodiment, the A-D converter 15 is connected between the displacement detector 13 and the error register 5. In the first described embodiment it was seen that the electric signals which represented any error in the position of the worktable 1 were continuously generated by the displacement detector 13 in the form of an analog value. In the present embodiment the analog signals are converted into digital signals by the A-D converter 15. The resultant digital signals are then collated with the values previously obtained by comparing the digital signals generated from the rotation angle detector 11 with the predetermined values of the input from the numerical control signal equipment 4 to thereby correct for any error in the position of the worktable 1 caused by the drive screw 2.

Figure 2:
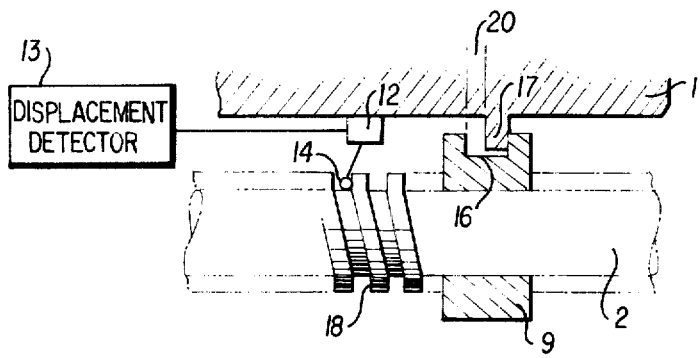
FIGS. 2 and 3 are enlarged views of the nut portion of FIG. 1.
Figure 3:
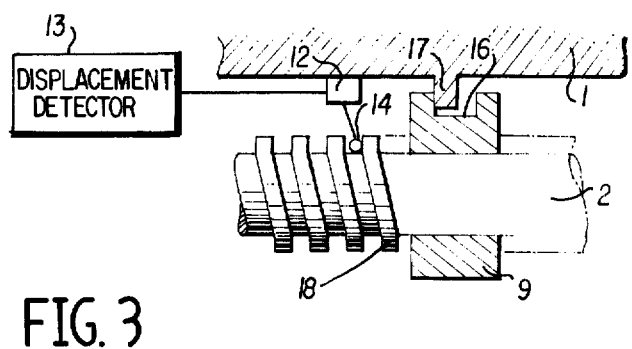

In order to more clearly understand the present invention an enlarged view of the nut portion of the embodiments of this invention is illustrated in FIGS. 2 and 3 as hereinafter described. The backlash illustrated is assumed to be between a dent 16 of the nut 9 and a projection 17 which is provided on the worktable 1 as a gap 20. In actuality this gap 20 corresponds to the gap between a thread of the nut 9 and a thread of the screw 2.

The contactor 14 of the contact member 12 has a spring action and is always connected to flank 18 of a left side thread of the drive screw 2. If it is assumed that the drive screw 2 is stopped after moving by rotation in a leftward direction, but before the worktable 1 is moved, as shown in FIG. 2, then the contactor 14 will be displaced in a leftward direction as shown. Now, if the drive screw 2 is rotated so as to move in a rightward direction, then the worktable 1 will not move during the time that the gap 20 is passed through. If the drive screw 2 continues to rotate beyond such gap time, then the projection 17 will engage with the left hand side of the dent 16 and the worktable 1 will move. When the worktable 1 moves, the contactor 14 will be displaced in a rightward direction in synchronization with the flank 18 of the thread as shown in FIG. 3. In response to the movement of the contactor 14, the displacement detector 13 will generate analog electrical signals indicative thereof. The value of the signals so generated is directly proportional to the distance of the backlash 20. The angular displacement of the contactor 14 thus relates to the displacement between a position of the nut 9 and the drive screw 2.

Figure 4:
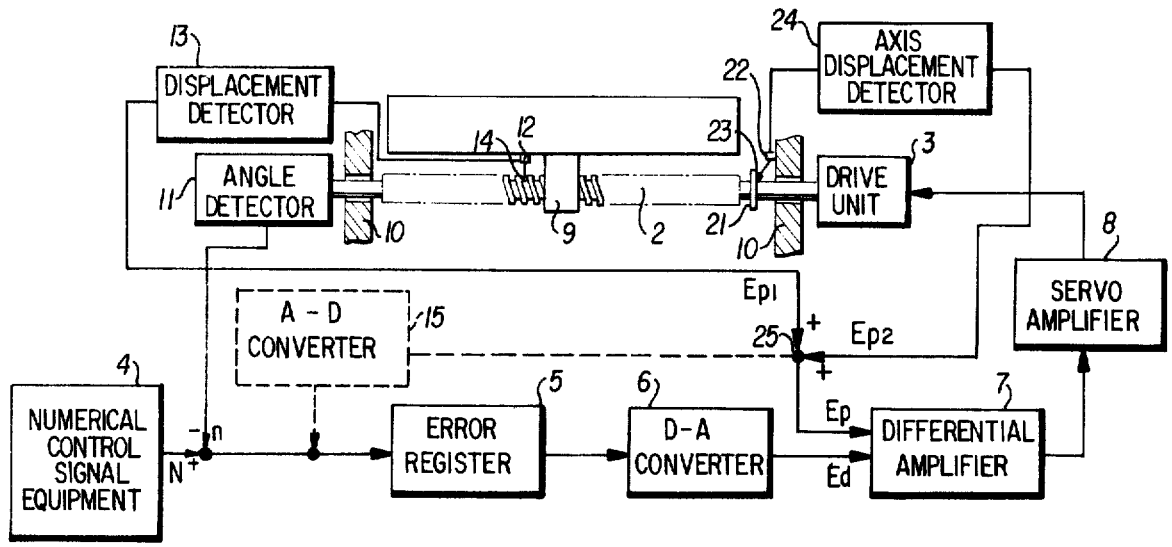
FIG. 4 is a schematic block diagram of a control system according to another embodiment of the present invention.

FIG. 4 shows still another embodiment of this invention. The mechanism and operation of the embodiment of FIG. 4 are substantially the same as in FIG. 1. Additionally, the embodiment shown in FIG. 4 includes a flange 21, an axis displacement contact member 22 having a contactor 23 depending therefrom and an axis displacement detector 24. The axis displacement contact member 22 is supported on the bearing portion 10 and is connected to the axis displacement detector 24. The axis displacement contact member 22 is also mechanically connected to flange 21. Output signals Ep2 obtained by the displacement detector 24 and the output signals Ep1 obtained by the displacement detector 13 are added by a conventional adder 25. The output of the adder 25 provides the error signals Ep for application to the differential amplifier 7. According to this embodiment, it should be apparent that the displacement of the drive screw for the axis direction itself may be detected.

Figure 5:
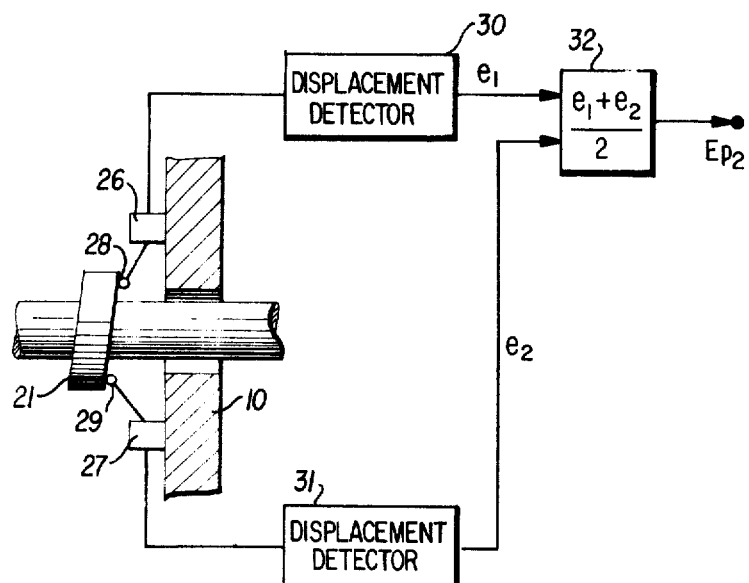
FIG. 5 is an enlarged view of the nut portion according to still another embodiment of the present invention.

As shown with reference to FIG. 5 if the flange 21 of FIG. 4 does not have a precise perpendicular surface for the center of the axis thereof, then an error will be produced upon each rotation cycle of the drive screw axis. Therefore, for such a situation, two axis displacement contact members 26 and 27 having respective contactors 28 and 29 are provided on opposite sides of the bearing portion such that the above defect can be compensated for.

The respective output signals of the contact members 26 and 27 are supplied to respective displacement detectors 30 and 31 whereby respective output signals e1 and e2 are generated. The output signals e1 and e2 are supplied to an arithmetic circuit 32 such that an average value, i.e., (e1 + e2)/2, is taken to thereby eliminate or omit any error from axis direction and distortion of the flange 21.

Obviously, numerous modifications and variations of the present invention are possible in light of the above teachings. It is therefore to be understood that within the scope of the appended claims the invention may be practiced otherwise than as specifically described herein. Accordingly,

What is claimed as new and desired to be secured by letters patent of the United States is:

1. A backlash compensating apparatus for a screw driven system comprising:
   a worktable,
   a drive screw,
   a nut,
   a drive unit for driving said worktable so as to linearly travel in accordance with said drive screw and said nut,
   rotation angle detecting means for generating a signal corresponding to the angle through which said drive screw is made to rotate by said drive unit,
   a servo system for determining the position of the worktable by collating said output signal from said rotation angle detecting means with a predetermined input value,
   a displacement detector coupled to said worktable to directly mechanically detect a position of said drive screw relative to a position of said worktable to thereby detect errors in the positioning thereof caused by backlash between a starting position of said worktable and a starting position of said drive screw, and
   means for correcting said backlash in accordance with output signals from said displacement detector by correcting the input signals to said drive unit.

2. A backlash compensating apparatus for a screw driven system as defined in claim 1, wherein said servo system comprises:
   an error register adapted to receive signals which denote a difference between the value of the output from said rotation angle detecting means and the predetermined input value, and to generate a digital output signal corresponding thereto,
   a digital-to-analog converter for converting the output signal from said error register into a corresponding analog value, and
   a differential amplifier connected to said converter and said displacement detector so as to actuate said drive unit according to the resultant output thereof.

3. A backlash compensating apparatus for a screw driven system as defined in claim 1 wherein said servo system comprises:
   an analog-to-digital converter for converting said output signals from said displacement detector which are of analog type into corresponding digital signals,
   an error register adapted to receive a digital signal obtained by collating the output from said analog-to-digital converter with said previous collating which was obtained from the output signal of said rotation angle detector and said prescribed input value, and
   a digital-to-analog converter for converting said digital signal from said error register into a corresponding analog signal so as to actuate said drive unit according to the resultant output thereof.

4. A backlash compensating apparatus for a screw driven system as defined in claim 1, wherein said displacement detector is an electric micrometer which is provided with a contact member having a contactor which makes direct contact with said drive screw.

5. A backlash compensating apparatus for a screw driven system as defined in claim 1, which further comprises:
   a flange on an axis of said drive screw; and,
   an axis displacement detector member having a contactor which makes contact with a flank of said flange, said axis displacement detector being coupled to a bearing portion of said drive screw so as to detect any errors in the axis position of said drive screw.

6. A backlash compensating apparatus for a screw driven system as defined in claim 5, which comprises another axis displacement detector which is coupled on said bearing portion of said drive screw axis, said two axis displacement detectors being respectively coupled on opposite sides thereof.

7. A backlash compensating apparatus for a screw driven system, which comprises:
   a worktable,
   a drive nut rigidly connected to said worktable,
   a drive screw cooperatively engaged with said drive nut;
   control means for generating a control signal indicative of the desired movement of said worktable;
   a drive unit for linearly driving said drive screw in response to said control signal received from said control means;
   rotation angle detecting means for generating a signal corresponding to the angle through which said drive screw is made to rotate by said drive unit;
   a servo system for determining the position of said worktable by collating said signal generated by said rotation angle detecting means with said control signal;

a displacement detector coupled to said worktable to directly detect a position of said drive screw relative to a position of said worktable to thereby detect errors in the positioning thereof caused by backlash between a starting position of said worktable and a starting position of said drive screw; and means for correcting said backlash by comparing the output signal from said displacement detector with said collated signal of said servo system.

* * * * *